United States Patent
Gnauert

(10) Patent No.: US 12,202,678 B2
(45) Date of Patent: Jan. 21, 2025

(54) BELT TEAR MONITORING SYSTEM

(71) Applicant: Rolf Gnauert, Marl (DE)

(72) Inventor: Rolf Gnauert, Marl (DE)

( * ) Notice: Subject to any disclaimer, the term of this patent is extended or adjusted under 35 U.S.C. 154(b) by 0 days.

(21) Appl. No.: 17/924,269

(22) PCT Filed: Jun. 24, 2021

(86) PCT No.: PCT/DE2021/100536
§ 371 (c)(1),
(2) Date: Nov. 9, 2022

(87) PCT Pub. No.: WO2022/007993
PCT Pub. Date: Jan. 13, 2022

(65) Prior Publication Data
US 2023/0174314 A1    Jun. 8, 2023

(30) Foreign Application Priority Data

Jul. 9, 2020  (DE) .................... 10 2020 118 189.2

(51) Int. Cl.
*B65G 43/02* (2006.01)

(52) U.S. Cl.
CPC ........ *B65G 43/02* (2013.01); *B65G 2203/046* (2013.01)

(58) Field of Classification Search
None
See application file for complete search history.

(56) References Cited

U.S. PATENT DOCUMENTS

| 4,087,800 | A  | * | 5/1978 | Lee ....................... | B65G 43/02 340/676 |
| 6,352,149 | B1 | * | 3/2002 | Gartland ................ | B65G 43/02 198/810.02 |
| 8,657,105 | B2 | * | 2/2014 | Twigger ................ | B65G 43/02 198/810.01 |
| 8,662,290 | B2 | * | 3/2014 | Twigger ................ | B65G 43/02 198/810.01 |

(Continued)

FOREIGN PATENT DOCUMENTS

| DE | 1 233 324 | 1/1967 |
| DE | 2 248 070 | 6/1973 |

(Continued)

OTHER PUBLICATIONS

International Search Report issued by the European Patent Office in International Application PCT/DE2021/100536 on Sep. 24, 2021.

*Primary Examiner* — Kavel Singh
(74) *Attorney, Agent, or Firm* — Henry M. Felereisen LLC

(57) ABSTRACT

A belt tear monitoring system for a conveyor belt includes an RFID tag embedded in the conveyor belt, and at least two conductor loops which are embedded in the conveyor belt and each closed. One of the at least two conductor loops is arranged within another one of the at least two conductor loops. The at least two conductor loops are short-circuited to one another at a short-circuit location, with the short-circuit location and the RFID tag being arranged in a region of belt edges of the conveyor belt which lie opposite one another in a longitudinal direction of the conveyor belt, and with the at least two conductor loops and the RFID tag being connected to one another in an electrically conductive manner.

14 Claims, 2 Drawing Sheets

(56) References Cited

U.S. PATENT DOCUMENTS

| | | | | |
|---|---|---|---|---|
| 10,196,216 B2* | 2/2019 | Sakuragi | ............... | B65G 15/08 |
| 10,745,207 B2* | 8/2020 | Hou | ..................... | B65G 15/34 |
| 10,829,310 B2* | 11/2020 | Sakaguchi | ............ | G06Q 10/20 |
| 10,962,444 B2* | 3/2021 | Chinnel | ............. | G01M 13/023 |
| 2017/0305683 A1 | 10/2017 | Sakuragi | | |

FOREIGN PATENT DOCUMENTS

| | | |
|---|---|---|
| DE | 44 44 264 | 4/1996 |
| DE | 197 13 560 | 12/1998 |
| EP | 0 798 241 | 12/2003 |
| GB | 1 384 499 | 2/1975 |
| JP | 2016-204070 | 12/2016 |
| WO | WO 2005/030621 | 4/2005 |
| WO | WO 2010/033526 | 3/2010 |
| WO | WO 2014/121790 | 8/2014 |

* cited by examiner

BELT TEAR MONITORING SYSTEM

CROSS-REFERENCES TO RELATED APPLICATIONS

This application is the U.S. National Stage of International Application No. PCT/DE2021/100536, filed Jun. 24, 2021, which designated the United States and has been published as International Publication No. WO 2022/007993 A1 and which claims the priority of German Patent Application, Serial No. 10 2020 118 189.2, filed Jul. 9, 2020, pursuant to 35 U.S.C. 119 (a)-(d).

BACKGROUND OF THE INVENTION

The invention relates to a belt tear monitoring system for a conveyor belt according to the features in the preamble of claim 1.

Belt conveyor facilities transport bulk materials over large distances of several kilometers in some instances and oftentimes under difficult environmental conditions. The facility represents a significant investment volume for the operator, with a high proportion of the facility costs incurred by the conveyor belt itself.

During operation of the conveyor facility, in particular when used in mining operations, there is the risk that the conveyor belt becomes damaged. As a result of a tear in the conveyor belt, in particular in longitudinal direction, i.e. in running direction of the conveyor belt, the conveyed material gets lost and the defective conveyor belt can massively damage the system itself. In particular, an initially short slit may also develop to a great length in order to damage the conveyor belt. This may be caused by the conveyed material itself, because the conveyed material passing through the slit widens the slit. However, the danger is partially great when blocking objects in the conveyor facility, for example large pieces of material or metallic foreign bodies, which deposit in the region of a feed chute, tear open the conveyor belt in longitudinal direction.

In order to avoid or minimize these risks, conveyor belt facilities are equipped with belt tear monitoring systems. Existing systems include transponders, induction coils for tear detection and normally two conductor loops in offset arrangement.

A common slit detection system includes a plurality of closed conductor loops which are embedded at intervals in the conveyor belt. The conductor loops are normally electrically conductive, in particular metallic. Within the conveyor belt facility, an electromagnetic signal is transmitted to the conveyor belt at at least one point along the running conveyor belt and can be received by the respective conductor loop. Depending on the belt tear monitoring system, the conductor loop itself can send a signal back, for example through electromagnetic resonance, or an electronic component, in particular a transponder, usually an RFID tag, can usually be addressed via the conductor loop in order to send back a signal. In all cases, a reaction of the conductor loop is established so long as the conductor loop is intact. When a conductor loop becomes severely damaged or breached, the reaction is absent. This is detected by the display and control unit associated with the belt tear monitoring system, so that inference can be made as to the presence of damage of the conveyor belt and the facility can be shut down.

Belt tear monitoring systems are known in a wide variety of embodiments. The system described in DE 1 233 324 B has induction loops which are attached transversely to the running direction in the conveyor belt. The induction loops lie in the surface area of the conveyor belt. Stationary magnets and receiver coils are arranged outside the conveyor belt. The receiver coils have an electromagnetic field. When the conveyor belt moves with an induction coil over a receiver coil, a current impulse is induced in the induction coil and in turn induces a signal in the stationary receiver coil. When the current flow in the induction coil is interrupted by a tear in the conveyor belt, the receiver does not receive a signal, so that the presence of damage to the conductor loop and thus to the conveyor belt can be concluded.

The system disclosed in WO 2014/121790 A1 has proven in operation. A device for determining an operating-endangering state of a conveyor belt is described. Transponders are embedded in the conveyor belt, with data contained in the transponder being able to be read out via an electromagnetic link by a receiving device which is attached in a stationary manner outside the conveyor belt.

EP 0 798 241 B1 also describes a conveyor belt with transponders embedded at intervals from one another.

Redundant systems have a combination of conductor loops and transmitters and receivers associated thereto and a tear detection via RFID sensors. These systems are characterized by their slight susceptibility to failure as well as by their functional capability. However, a disadvantage is the high costs for the two systems. In addition, the systems have a greater risk of damage due to the large number of components. Furthermore, the mechanical stress on the conveyor belt is higher, since two different systems have to be installed.

Against the background of the state of art, the invention is based on the object of providing a functionally stable and redundant belt tear monitoring system which has high failure safety and which is improved both in construction and in production.

SUMMARY OF THE INVENTION

This object is attained according to the invention by a belt tear monitoring system as set forth hereinafter.

Advantageous configurations and refinements are the subject matter of the dependent claims.

The belt tear monitoring system for a conveyor belt includes at least two conductor loops embedded in the conveyor belt. Furthermore, provision is made for embedment of an RFID tag in the conveyor belt. Each of the conductor loops is closed. One of the two closed conductor loops is arranged inside the other conductor loop, i.e. it is arranged in the surface area spanned by the other conductor loop. An inner one of the closed conductor loops is preferably located completely within the outer closed conductor loop.

According to the invention, the conductor loops are short-circuited to one another at a short-circuit location, i.e. directly electrically conductively connected. Furthermore, the conductor loops and the RFID tag are electrically conductively connected to one another. The short-circuit location and the RFID tag are arranged in the region of belt edges of the conveyor belt which are opposite one another in longitudinal direction of the conveyor belt. The short-circuit location is consequently located in the border-side region on one longitudinal side of the conveyor belt, whereas the RFID tag is located in the border-side region on the opposite other longitudinal side of the conveyor belt.

The belt tear monitoring system according to the invention integrates the system of tear detection via conductor loops, with associated transmitter and receiver, and the system of tear detection via an RFID tag into a functionally stable and redundant belt tear monitoring system, which is improved in both construction and production, with the number of necessary system components being reduced. This reduces susceptibility to failure and increases reliability. A diverse redundant system is created. Diversity results from the fact that different transmitting and receiving systems are used, which communicate with the conductor loops on one hand and with the RFID tag on the other hand. The redundancy is realized by using two systems. In particular, due to the diverse redundant system, false alarms can be avoided or at least significantly reduced.

The RFID tag used according to the invention is wired and has an input and an output via which it is electrically connected to the conductor loops. The RFID tag interacts with a transmitting and receiving unit via which it is supplied with voltage and via which the identification of the RFID tag is read out. The transmitting and receiving unit includes an antenna and a reader or an RFID reading unit.

An otherwise necessary additional wire for the RFID-based slit detection system within the loops can be saved. The RFID tag is connected between the two conductors or conductor wires of the conductor loops.

The short-circuited conductor loops provide a plurality of alternative electrical current paths for the transmission of the electrical signal. It is only when all possible electrical paths are interrupted that a serious damage is ascertained, i.e. In particular a longitudinal tear, and the facility is shut down.

Interfering impairments of the signals generated in the system are reduced. The conductor-loop-based system operates with loop signals in the frequency range of 50 kHz, while the RFID-tag-based detection system is operated at 12 MHz or in the high frequency range at 800-860 MHz. In the event of a disturbance in the 50 kHz range, frequencies in the range of 12 MHz or 800-860 MHz are not impaired as a consequence.

The voltage induced in the conductor loops does not impair the RFID tag. Conversely, the energy fed via the RFID tag does not adversely affect the loop signal of the conductor loops.

The RFID tag includes an electronic microchip and a coupling element, in particular a coil or a microwave antenna. Furthermore, the RFID tag is provided with an input circuit which is designed in such a way that an electrical resistance in a conductor loop of greater than 100 ohms is recognized as a severed conductor loop, i.e. serious damage to the conductor loop. Furthermore, the circuit is so designed and ensures that the RFID tag does not adversely influence the frequency range of the conductor-loop-based system (50 kHz), i.e., for example attenuates it. In addition, the circuit is provided and designed such that the energy fed by the 50 kHz transmitter has no effect on the RFID tag.

The conductor loops are operated with low ohmic resistance. Consequently, the conductor cross-section is comparatively great. When damage to a conductor wire of a conductor loop is encountered, the ohmic resistance in the conductor loops increases. As a result, a loop signal is sometimes detected and sometimes absent. Such error messages may lead to a shutdown of the conveyor facility under certain circumstances. This is now avoided, because the system operates redundantly via the RFID-tag-based tear detection. The RFID tag can operate with substantially higher ohmic resistances and generates a signal across the part of the conductor loops that is intact. This means, even when the conductor loop signal is absent, but the RFID-generated signal is properly generated, it can be concluded therefrom that although the loop is possibly damaged, there is no longitudinal tear in the conveyor belt. A check can then be undertaken in the course of a regular inspection or maintenance without encountering an extraordinary interruption of operation.

Advantageously, the conductor loops are short-circuited and electrically conductively connected by a short-circuit element, for example a connecting bridge.

Furthermore, it is advantageous when the conductor loops lie within one another, i.e. are arranged concentrically with respect to one another.

Each conductor loop has two transverse sections which extend transversely to the longitudinal direction of the conveyor belt over the substantial part of the width of the conveyor belt.

Furthermore, each conductor loop includes two length sections which extend in the longitudinal direction of the conveyor belt.

One aspect of the invention provides that the conductor loops are short-circulated between two length sections arranged adjacent to one another on a longitudinal side of the conveyor belt.

The RFID tag is electrically conductively connected on the opposite side of the conveyor belt between the two length sections arranged there adjacent to one another.

A conductor of a conductor loop has a diameter of 1.0 mm to 3.0 mm, in particular of 1.5 mm to 2.5 mm. The diameter is preferably 2.0 mm. The diameters can have a deviation of $\pm 10\%$.

The RFID tag is electrically conductively connected to the conductor loops via connecting conductors. A connecting conductor has a reduced diameter compared to the diameter of a conductor loop by a multiple, in particular by 20 times. A connecting conductor can have a diameter of 0.05 mm to 0.2 mm, in particular of 0.1 mm, $\pm 10\%$, respectively.

For monitoring and for tear detection, a transmitter and a receiver are associated to the conductor loops. The transmitter induces in the conductor loops a current impulse, which generates a corresponding signal in the receiver when the conductor loop is intact.

The RFID tag embedded in the conveyor belt is assigned a transmitting and receiving unit in the system. Outside the transmitting and receiving unit, the RFID tag is passive. The RFID tag is coupled via the transmitting and receiving unit via magnetic alternating fields or radio-frequency radio waves. The RFID tag is thus also supplied with energy. The receiver part of the transmitting and receiving unit assumes read out of the identification of the RFID tag.

The evaluation of the signals and data generated in the monitoring system, as well as the control of the belt tear monitoring system, is established via a display and control unit. The display and control unit executes the data processing and controls the system such that all operations are carried out in a timely and logical order.

The conductor loop subsystem operates in a frequency range of 50 kHz. The subsystem of the RFID-tear-assisted tear detection operates in the ultra-high-frequency range UHF, in particular in a frequency range of 12 MHz or in the ultra-high-frequency range between 800-860 MHz.

The belt tear monitoring system also includes a device for path measurement on the conveyor belt. For this purpose, a displacement pick-up or sensor is integrated. The displacement pick-up is provided to measure the distance between pulse generators in the conveyor belt with respect to a reference point. In conjunction with the control unit, a position determination of a damage to the conveyor belt can thus be established.

Furthermore, a tear monitoring of the conveyor belt can be realized via the conductor loops and in particular the RFID tag. In particular, the supporting top plate of the conveyor belt can thus be monitored for the presence of wear. When a certain wear limit is exceeded, this can be detected via the conductor loops as well as via the RFID tag, so that corresponding repair or replacement measures can be initiated.

The belt tear monitoring system according to the invention, in particular the components of the conductor loop configuration that are essential to the invention including a short-circuit location and a conductively connected RFID tag, can be installed during new production of conveyor belts. It is also possible to retrofit existing conveyor belts.

BRIEF DESCRIPTION OF THE DRAWING

The invention is explained below with reference to drawings. It is shown in.

Figure 1:
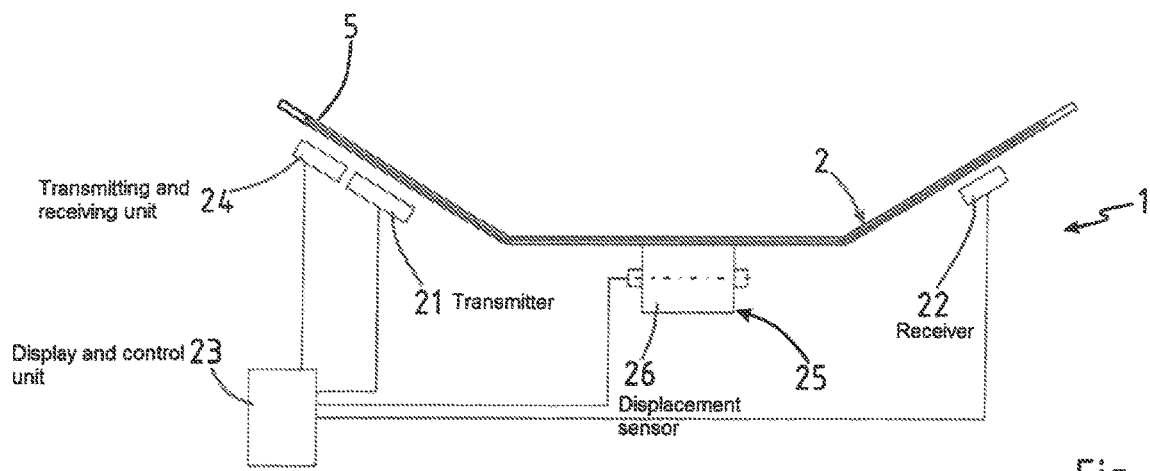
FIG. 1 a technically schematic front view of a conveyor facility with a conveyor belt and a belt tear monitoring system.
Figure 2:
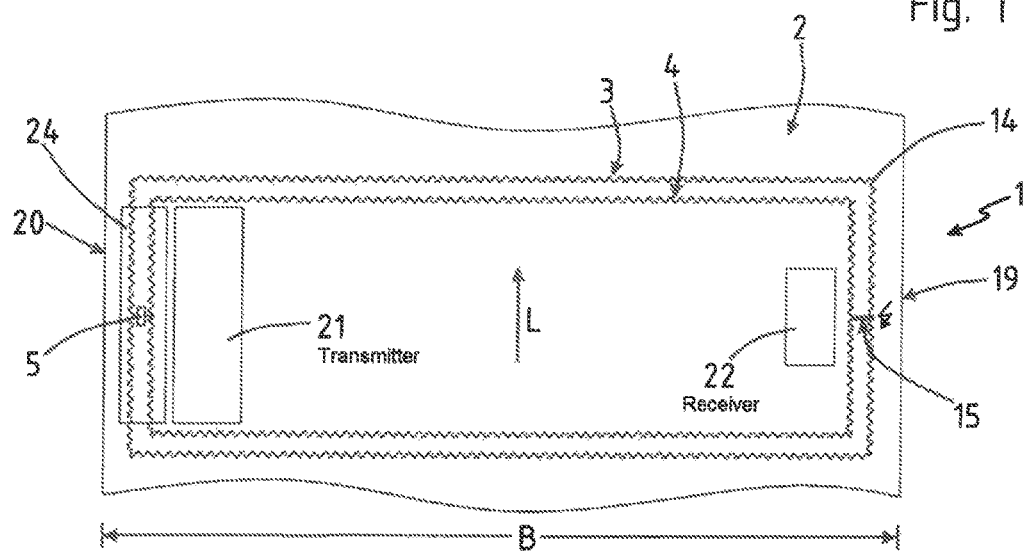
FIG. 2 a plan view of a portion of the conveyor belt with the belt tear monitoring system.
Figure 3:
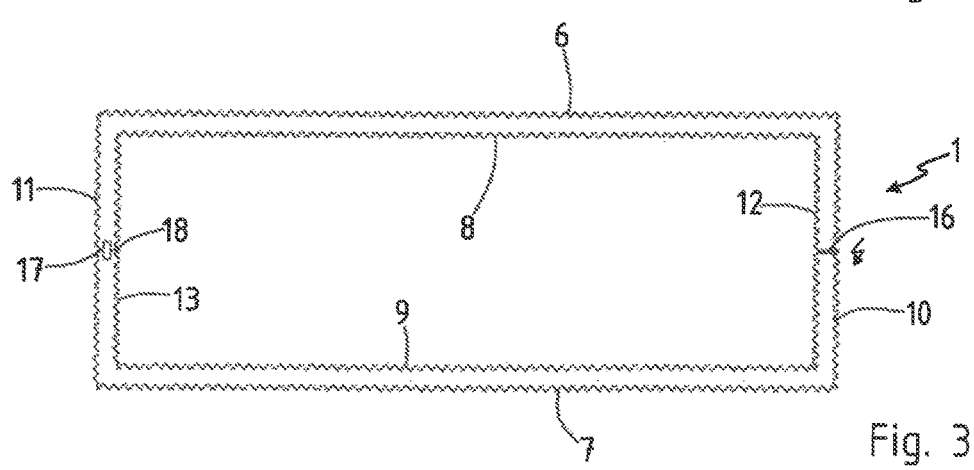
FIG. 3 the conductor loops of the belt tear monitoring system in undamaged state.

The basic structure of a belt tear monitoring system 1 according to the invention for a conveyor belt 2 is illustrated and explained with reference to FIGS. 1 to 3.

DETAILED DESCRIPTION OF PREFERRED EMBODIMENTS

The belt tear monitoring system 1 includes two conductor loops 3, 4 which are embedded in the conveyor belt 2 and closed respectively, and an RFID tag 5 which is embedded in the conveyor belt 2.

The conductor loops 3, 4 lie within one another and are positioned at slight distance from one another. Both, the outer conductor loop 3 and the inner conductor loop 4 have two transverse sections 6, 7 or 8, 9, which extend transversely to the longitudinal direction L of the conveyor belt 2 over the substantial part of the width B of the conveyor belt 2. Furthermore, each conductor loop 3, 4 has two longitudinal sections 10, 11 or 12, 13 which extend in longitudinal direction L of the conveyor belt 2. The conductor loops 3, 4 are each formed from a conductor 14 or conductor wire, which has a diameter of 1 to 3 mm, in particular 2 mm.

The conductor loops 3, 4 are short-circuited to one another at a short-circuit location 15 and are directly electrically conductively connected. This is realized via a short-circuit element 16 in the form of an electrically conductive bridge. In FIGS. 2 to 6, the short-circuit locations 15 are additionally characterized by the zigzag arrow (flash ⚡ )

The RFID tag 5 is also electrically connected to the conductor loops 3, 4, so that the conductor loops 3, 4 are connected to one another via the RFID tag 5 and form an electric circuit. For this purpose, the RFID tag 5 is connected to the conductor loops 3, 4 via an input 17 and an output 18 with a connecting line in each case.

The short-circuit location 15 lies in the border-side region of a first belt edge 19 of the conveyor belt 2. The RFID tag 5 is arranged in the region of the second belt edge 20 which is opposite in longitudinal direction L of the conveyor belt 2. The short-circuit location 15 and the RFID tag 5 consequently lie on different sides of the conveyor belt 2 and far apart from one another in relation to the width B of the conveyor belt 2.

The short-circuit location 15 is provided between the two longitudinal sections 10, 12 arranged adjacent to one another in the region of the first belt edge 19 and the conductor loops 3, 4 are short-circuited here. The RFID tag 5 is electrically conductively connected between the two length sections 11, 13 arranged adjacent to one another in the region of the second belt edge 20. The connecting lines, via which the RFID tag 5 is electrically conductively connected to the conductor loops 3, 4, have a diameter of 0.05 mm to 0.2 mm, in particular of approx. 0.1 mm.

A transmitter 21 and a receiver 22 are associated to the conductor loops 3, 4 and are positioned at a distance underneath the conveyor belt 2. An electromagnetic signal is transmitted via the transmitter 21 to the conveyor belt 2 and is received by the conductor loops 3, 4. When the conductor loop 3, 4 is intact, this induces a signal in the receiver 22, so that a proper state of the conductor loops 3, 4 and thus of the conveyor belt 2 is detected via a downstream or associated display and control unit 23. When the current flow in a conductor loop 3, 4 or a current path of the conductor loop 3, 4 is interrupted by a tear or damage, no signal is detected in the receiver 22 and the damage to the conductor loop 3, 4 is detected.

A transmitting and receiving unit 24 is associated to the RFID tag 5 and arranged in the illustrative exemplary embodiment illustrated here next to the transmitter 21 for the conductor loops 3, 4 in relation to the width B of the conveyor belt 2. It is to be understood that in practice the arrangement of transmitter 21 and transmitting and receiving unit 24 can also be realized behind one another in longitudinal direction L.

The RFID tag 5 does not have its own power supply and is passive outside the area of the antenna of the transmitting and receiving unit 24. When the RFID tag 5 enters the transmitting region of the antenna of the transmitting and receiving unit 24, it is activated by the radiated energy of the transmitter part and transmits the information located in its data memory to the receiver part of the transmitting and receiving unit 24.

The downstream computer of the display and control unit 23 has a list of all transponder codings and recognizes the absence of a signal, so that the conveyor belt 2 can be stopped as a function of the error detection and evaluation.

The conductor loops 3, 4 which are short-circuited at the short-circuit location 15 and are connected via the RFID tag 5 provide alternative current paths for a signal. Depending on the damage detection and evaluation, the operation of the conveyor belt 2 can be maintained or the facility can be shut down.

Various damages to the conductor loops 3, 4 with an evaluation of the damage pattern and the reactions resulting therefrom are explained with reference to FIGS. 4 to 7.

Figure 4:
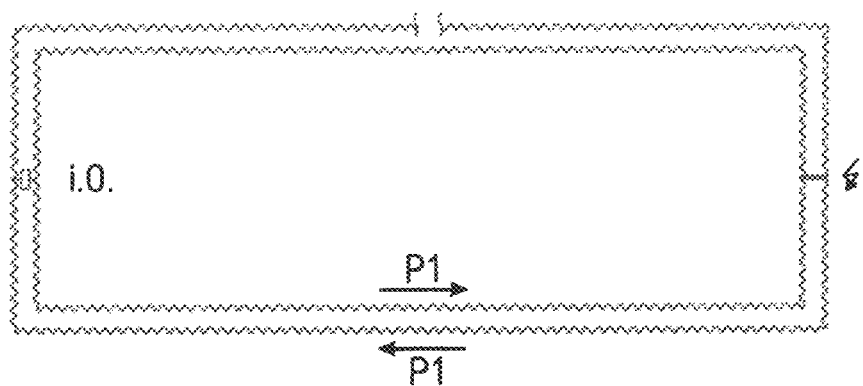
FIGS. 4 to 7 four different fault states in the conductor loops of the belt tear monitoring system.

In the illustration of FIG. 4, the transverse section 6 of the conductor loop 3 is interrupted. This can be caused by a breaking spot in the conductor wire. Otherwise, the conveyor belt 2 is not damaged.

The inner conductor loop 4 is intact. Also, a signal transmission from the output 18 of the RFID tag 5 to the input 17 of the RFID tag 5 is established via the conductor loop 3 or the lower path via the transverse section 9 and the transverse section 7 of the conductor loop 3. The current path or signal line is illustrated in FIG. 4 by the arrows P1.

The belt tear monitoring system 1 concludes that the conveyor belt 2 is in order and no longitudinal tear is present. The proper state is indicated in FIG. 4 by the abbreviation i.O. A shutdown of the conveyor facility is not necessary.

Figure 5:
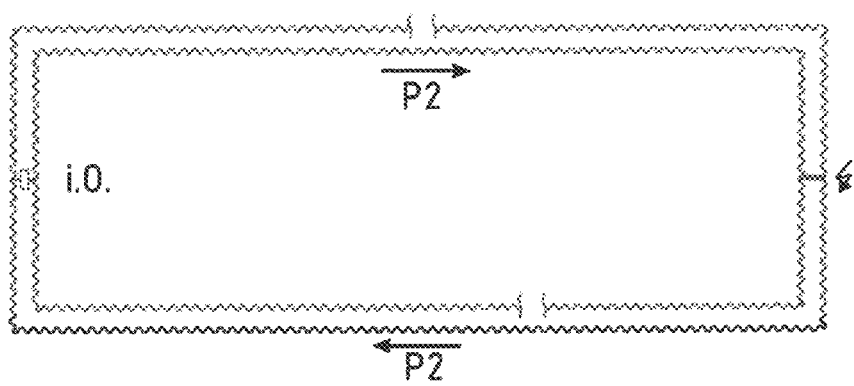

In the case of the damage pattern shown in FIG. 5, the transverse section 6 of the conductor loop 3 and the transverse section 9 of the conductor loop 4 are interrupted. The conductor-loop-induced signal is absent. Conventionally, this would result in stoppage of the conveyor belt 2. However, since a signal transmission is established via the RFID-tag 5-based loop system, this being realized via the length sections 13, 12 and the transverse sections 8 and 7 and the short-circuit location 15 as identified by the arrows P2, the belt-tear monitoring system 1 detects damage to the affected conductor loops 3 and 4, but still does not evaluate this state as a longitudinal tear, so that the facility can continue to be operated properly (i.O.).

Figure 6:
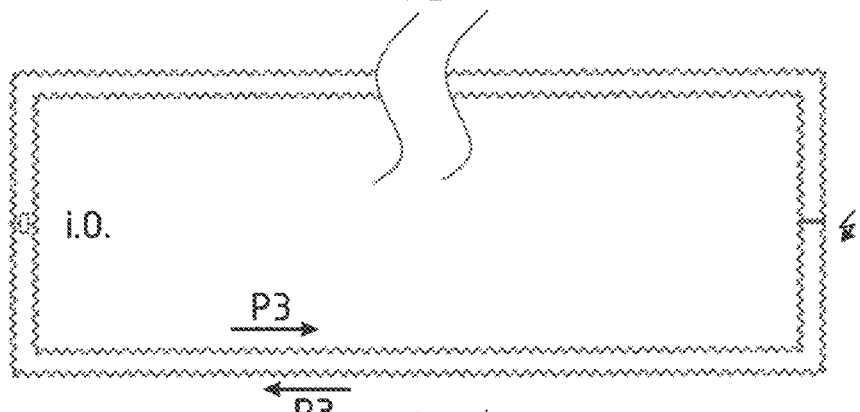

In the illustration of FIG. 6, the two conductor loops 3 and 4 are severed in the region of their transverse sections 6, 8. Proper signal transmission is established via the transverse sections 7 and 9. The current path from the RFID tag 5 via the transverse section 9 and the short-circuit location 15 as well as the transverse section 7 back to the RFID tag 5 is illustrated by the arrows P3. This damage pattern is also classified as correct (i.O.) and is not being assessed as a longitudinal tear. The conveyor belt 2 can continue to be operated.

Figure 7:
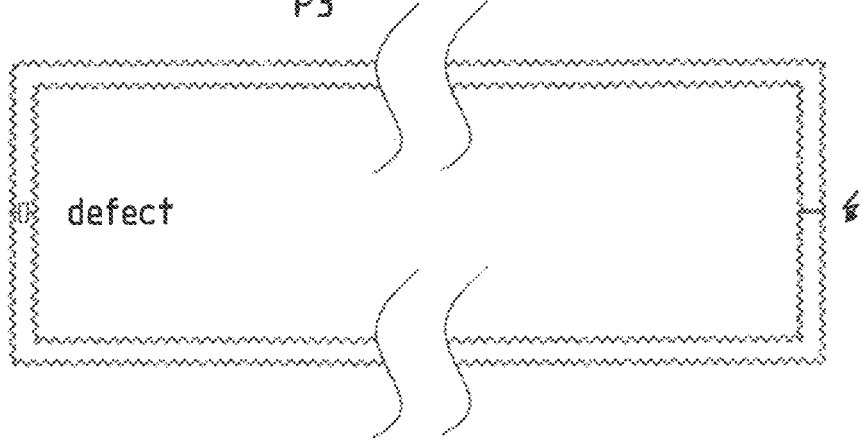

A serious damage to the conveyor belt 2 in which the two conductor loops 3, 4 are severed both in the transverse sections 6 and 8 and in the transverse sections 7 and 9 is shown in FIG. 7. A current flow or signal transmission via one of the conductor loops 3, 4 is not possible. Consequently, the detection signal via the conductor-loop-based slit detection as well as via the RFID tag 5-based slit detection is absent. This is classified as serious damage with a longitudinal tear and the facility is shut down.

A belt travel detection device 25 is provided to assess at which point a particular part of the conveyor belt 2 is located within the conveyor facility and includes a displacement sensor 26 for measuring the distance between pulse generators in the conveyor belt 2 and a reference point. In cooperation with the display and control unit 23 and evaluation or localization of the damaged conductor loops 3, 4, a position determination of damage to the conveyor belt 2 can be carried out.

What is claimed is:

1. A belt tear monitoring system for a conveyor belt, said belt tear monitoring system comprising:
    at least two separate, closed conductor loops embedded in the conveyor belt, the conveyor belt having a first belt edge and a second belt edge located opposite the first belt edge as viewed in a direction perpendicular to the longitudinal direction of the conveyor belt, with one of the at least two separate, closed conductor loops being arranged within another one of the at least two separate, closed conductor loops, said one separate, closed conductor loop being short-circuited to an adjacent one of the at least two separate, closed conductor loops at a short-circuit location disposed proximate to the first belt edge, and
    a RFID tag embedded in the conveyor belt proximate to the second belt edge, the RFID tag electrically connected between the adjacent separate closed conductor loops.

2. The belt tear monitoring system of claim 1, further comprising a short-circuit element configured to short-circuit the at least two separate, closed conductor loops at the short-circuit location.

3. The belt tear monitoring system of claim 1, wherein the at least two separate, closed conductor loops include each two transverse sections which extend transversely to the longitudinal direction of the conveyor belt over a substantial part of a width of the conveyor belt.

4. The belt tear monitoring system of claim 1, wherein the at least two separate, closed conductor loops include each two length sections which extend each along the first and second belt edges of the conveyor belt.

5. The belt tear monitoring system of claim 4, wherein the at least two separate, closed conductor loops are short-circuited between adjacent length sections arranged along the first belt edge.

6. The belt tear monitoring system of claim 4, wherein the RFID tag is connected between adjacent length sections arranged along the second belt edge.

7. The belt tear monitoring system of claim 1, wherein the at least two separate, closed conductor loops include each a conductor defined by a diameter of 1.0 mm to 3.0 mm+/−10%.

8. The belt tear monitoring system of claim 1, wherein the at least two separate, closed conductor loops include each a conductor defined by a diameter of 1.5 mm to 2.5 mm+/−10%.

9. The belt tear monitoring system of claim 1, wherein the at least two separate, closed conductor loops include each a conductor defined by a diameter of 2.0 mm+/−10%.

10. The belt tear monitoring system of claim 1, wherein the RFID tag is electrically conductively connected to the at least two separate, closed conductor loops via connecting conductors, said connecting conductors each being defined by a diameter of 0.05 mm to 0.2 mm+/−10%.

11. The belt tear monitoring system of claim 1, wherein the RFID tag is electrically conductively connected to the at least two separate, closed conductor loops via connecting conductors, said connecting conductors each being defined by a diameter of 0.1 mm+/−10%.

12. The belt tear monitoring system of claim 1, further comprising a transmitter and a receiver which are operably connected to the at least two separate, closed conductor loops.

13. The belt tear monitoring system of claim 1, further comprising a transmitting and receiving unit operably connected to the RFID tag.

14. The belt tear monitoring system of claim 1, further comprising a display and control unit operably connected to the at least two separate, closed conductor loops.

* * * * *